United States Patent [19]

Cohen

[11] Patent Number: 4,600,984
[45] Date of Patent: Jul. 15, 1986

[54] TWO QUADRANT POWER MODULATOR

[76] Inventor: Itzchak Cohen, 1171 Carll's Straight Path, Dix Hills, N.Y. 11746

[21] Appl. No.: 773,626

[22] Filed: Sep. 9, 1985

Related U.S. Application Data

[63] Continuation of Ser. No. 585,502, Mar. 2, 1984.

[51] Int. Cl.⁴ ............................................. H02M 7/44
[52] U.S. Cl. .......................................... 363/97; 363/26
[58] Field of Search ......................... 363/17, 24, 25, 26, 363/71, 72, 96, 97, 98

[56] References Cited

U.S. PATENT DOCUMENTS 4,189,764 2/1980 Snyder .................................. 363/97
4,327,406 4/1982 Ashley .................................. 363/56

Primary Examiner—Patrick R. Salce
Assistant Examiner—Anita M. Ault
Attorney, Agent, or Firm—Michael I. Kroll

[57] ABSTRACT

A two quadrant power modulator using bi-directional and uni-directional flyback converters in which output waveshape is determined by the modulation of the pulse repetition rate and width. The output voltage is equal to the square root of the driving function. A large number of converters may be paralleled with sequential switching to raise the output power and raise the output ripple frequency, thereby simplifying filtering. Output voltage is constant with varying load condition irrespective of the reactive or non-linear nature of the load.

A two quadrant power modulator using flyback converters to generate a time varying voltage. Dynamic regulation and low output impedance are achieved without use of closed loop control. Input voltage is not distorted by reactive and/or non-linear loads.

4 Claims, 4 Drawing Figures

TWO QUADRANT POWER MODULATOR

BACKGROUND OF THE INVENTION

This is a continuation of U.S. patent application Ser. No. 06/585,502 filed March 2, 1984.

The present invention relates generally to electronic inverters and to electronic wave and function synthesizers. Inverters are electronic systems which have as their input a direct current source and have as their outputs a time varying wave. Two basic types of sine wave inverters are presently available: square wave inverters followed by passive low pass filtering and waveform synthesizers followed by passive low pass filtering.

Square wave inverters have the disadvantage of using low frequency magnetics which are both heavy and space consuming. In addition, the dynamic output impedance of the inverter is high due to the high impedance of the output low pass filter.

Waveform synthesizer type inverters generate outputs according to two algorithms: open loop circuits in which each component of the synthesized wave is independently generated and then summed to form a complete synthesized wave and closed loop systems in which the output is forced to follow a reference wave. While both synthesizer systems have the advantage of a low output impedance, the open loop inverters cannot fully compensate for rapid changes in load or input voltage occurring in time intervals much shorter than the output voltage period. Closed loop systems are rather complicated, have relatively low gain at high frequencies, are difficult to stabilize, and their rejection of fast load and line transients is hampered by the dynamics inherent in their control loops.

SUMMARY OF THE INVENTION

It is therefore a primary object of the present invention to provide a two quadrant power modular which eliminates the use of a classical closed loop which usually comprises a time varying reference, error amplifiers and compensation networks and the associated dynamics as a control mechanism for generating a time varying voltage.

In the present invention the control mechanism operates by forcing the input power to a converter to follow the instantaneous power demand of the output, providing the exact amount of power needed to generate a low distortion preprogrammed waveform across the load, independently of the load characteristics thereby reducing the output dynamic impedance to the absolute minimum theoretically obtainable and eliminating the influence of fluctuations in the input power of the converter on its output voltage.

The manner in which this is accomplished may be better understood by the consideration of a 100% efficient switching [FIG. 4] converter as a two port "black box" with input voltage $v_{in}$, input current $i_{in}$, output voltage $v_{out}$, output current $i_{out}$, input power $p_{in}$ and output power $p_{out}$. The principle of this invention is to force the converter input power to follow its output power demand on virtually instantaneous basis, by forcing the following relationship:

$$P_{in} = K * (i_{out}/v_{out}) \quad (1)$$

* indicates multiplication

If the converter exhibits 100% efficiency, the output power must be equal to the input power:

$$P_{out} = P_{in} \quad (2)$$

Combining (1) and (2) yields:

$$P_{out} = K * (i_{out}/v_{out}) \quad (3)$$

At the same time, $P_{out}$ is given by:

$$P_{out} = i_{out} * v_{out} \quad (4)$$

Combining (4) and (3) yields:

$$v_{out} * i_{out} = K * (i_{out}/v_{out}) \quad (5)$$

or, $$v_{out}^2 = K \quad (6)$$

or $$v_{out} = K^{\frac{1}{2}}, \quad (7)$$

which indicates that a converter whose operation is governed by constraint (1) will generate a voltage equal to the square root of the parameter K.

Result (7) warrants further discussion. The fact that the output voltage of the converter equals to $K^{\frac{1}{2}}$ indicates that the output voltage of a converter controlled according to algorithm (1) is totally insensitive to:
a. fluctuations in converters input voltage
b. fluctuations in converters output current
c. any combination thereof
d. the rapidity of the fluctuations In other words, the converter exhibits essentially zero output impedance and perfect static and dynamic line regulation, both important objects of the invention.

Reconsidering the above mentioned converter, assume that the power transfer is controlled by a switch $s_1$ which [FIG. 4] closes and opens periodically. The power will be drawn from the input source as a string of pulses occurring at a repetition frequency f. Each pulse will have a width $t_{on}$ equal to the time $S_1$ is closed.

The energy drawn from the source during the time the switch is closed will be:

$$E_p = \int_0^{t_{on}} v_{in}(t) i_{in}(t) dt \quad (10)$$

The average power drawn from the input source and forced into the load will be equal to the energy contained in one pulse ($E_p$) times the number of pulses occurring in one second, which is by definition the repetition rate (or frequency) f:

$$P_{in} = f * \int_0^{t_{on}} v_{in}(t) i_{in}(t) dt = f * E_p \quad (11)$$

In order to be able to force condition (1) we must be able to modulate the input power to the converter. Equation (11) indicates that the input power can be modulated by either varying the value of f (frequency modulation) or the value of the pulse energy $E_p$ by varying $t_{on}$ (pulse width modulation) or a combination of both. It is important to note that in case of frequency modulation we have to assure that the energy $E_p$ is constant; this can be achieved by varying $t_{on}$ so the value of the integral is kept constant.

If it is assumed that the pulse energy is kept constant to a value $E_o$ by forcing:

$$\int_0^{t_{on}} v_{in}(t) i_{in}(t) dt = \text{const.} = E_p \tag{12}$$

In this case the power will be:

$$P_{in} = P_{out} = E_o * f \tag{13}$$

Substituting into (4) and (5) we get:

$$K*(i_{out}/v_{out}) = E_o * f; \tag{14}$$

or, $$f = (K/E_o)*(i_{out}/V_{out}), \tag{15}$$

which is the control algorithm for a frequency modulated converter exhibiting the desired characteristics.

If the load on the switching converter forces a reversal of the output current the flow of energy reverses. The energy flows from the output to the input which provides for reactive energy storing loads. In order to allow this mode of operation, the converter must be bi-directional, or two converters, each transferring power in opposite directions can be employed.

In an application of the invention to a DC to AC inverter, what is known to the art as a bi-directional flyback [FIG. 3] converter is used with switch $S_1$ operating one port and switch $S_2$ operating the other port. It is a well known fact that a flyback converter operating in the discontinuous mode acts as a power source whose output is:

$$P_{out} = f*E_{mag} = f*\tfrac{1}{2}L_{mag}I_{pk}^2 \tag{16}$$

where $E_{mag}$ is the peak value of energy stored in the core, $L_{mag}$ is the magnetizing inductance of the winding and $I_{pk}$ is the peak current in the winding. Equation (16) will apply equally to either port of a bi-directional flyback converter. If the peak energy stored in the core is kept constant and equal to a value $E_o$ by terminating the conduction of the switch when the current in its winding reaches a predetermined value the following equation is obtained:

$$P_{out} = f*E_o \tag{17}$$

Now equation (11) can be realized by making f proportional to the value of $i_{out}/v_{out}$.

Furthermore, the converter will operate as a two quadrant converter, able to act as either a source or a sink for energy, if, for positive values of $i_{out}/v_{out}$ (positive frequency) $S_1$ is operated, and, for negative values of $i_{out}/v_{out}$ ("negative" frequency) $S_2$ is operated.

Controlled operation of the bi-directional converter in two quadrants is main object of the invention, permitting voltage modulation across resistive and reactive loads, both linear or nonlinear.

As indicated by (7), the output voltage is independent of input voltage or output current and is equal to $K^{\frac{1}{2}}$. If instead of a D.C. voltage a time varying voltage is desired, all that is necessary is to modulate K accordingly. For example a sinusoidal voltage variation can be obtained by using:

$$K = K_1 \sin^2 \omega t \tag{18}$$

where $\omega$ is the angular frequency of the desired sine wave. In this case:

$$v_{out} = K^{\frac{1}{2}} = (K_1 \sin^2 \omega t)^{\frac{1}{2}} = K_1^{\frac{1}{2}} * |\sin \omega t| \tag{19}$$

The result is a full wave rectified sinusoidal voltage. If four quadrant operation and therefore an alternating voltage is desired, a bridge of switches may be added to the output of the two quadrant modulator. The bridge has to be driven by a sign (sin$\omega$t) function in order to correctly invert the output voltage to an AC form.

The sign function is defined as:

$$\text{sign}(\sin \omega t) = \begin{cases} +1 \text{ for } \sin \omega t \geq 0 \\ -1 \text{ for } \sin \omega t < 0 \end{cases}$$

As shown in (19) $v_{out} = K_1^{\frac{1}{2}} * |\sin \omega t|$. The value $K_1$ may vary with time and temperature, resulting in a slow drift of the output voltage. In order to eliminate the drift, the value of $K_1$ can be adjusted by the output of an error amplifier which will compare the average or RMS value of the output voltage to a reference voltage, increasing or decreasing $K_1$ as needed in order to regulate the output voltage. The bandwidth of the amplifier has to be much lower than the frequency of the output voltage in order to eliminate modulation of $K_1$ at the output frequency and introduce distortion. In the flyback converter case, a convenient way to adjust the value of $K_1$ is to terminate the switch conduction which the switch current $I_{pk}$ (converted to a voltage) equals the error amplifier output voltage. The result of varying $I_{pk}$ will be change in the value of $E_{mag}$, to which $K_1$ is directly proportional.

It must be emphasized that the amplifier mentioned above is not an error amplifier in the classical sense, nor is it essential to the operation of the system.

If we were to assume that none of the circuit parameter will drift with temperature, time, etc., the output voltage will still be line and load regulated, even without the amplifier. The function of the amplifier is therefore to improve the performance of the system, by cancelling the effect of drifts.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DESCRIPTION OF THE PREFERRED EMBODIMENT

Figure 1:
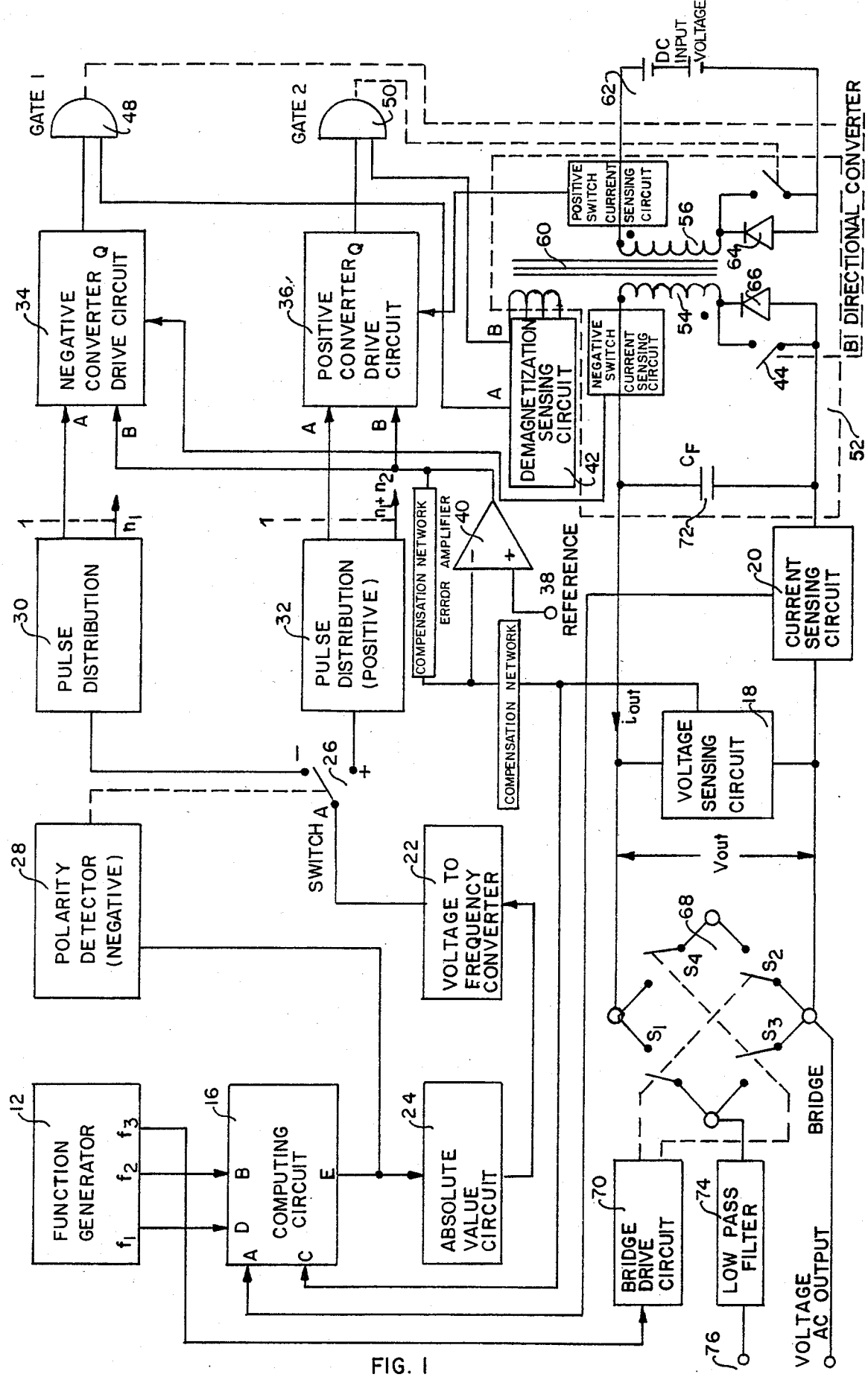
FIG. 1 is an electronic block diagram of the invention as applied to a DC to AC inverter, shown with a single bi-directional converter.

It has already been demonstrated that, by using a bi-directional converter, the output voltage, $v_{out}$ may be forced to follow the equation (see FIG. 1):

$$v_{out} = (K)^{\frac{1}{2}} \quad (20)$$

In the preferred embodiment, this is accomplished by a combination of frequency and pulse width modulation, the frequency modulation being used to obtain a desired waveform and to control the instantaneous value of the output voltage, whereas pulse width modulation is used to satisfy the requirement of constant pulse energy.

Frequency Modulation

It is assumed for the present demonstration that the output desired from the invention is a sine wave. It has already been demonstrated that by setting $K = K_1 \sin^2 \omega t$ a sine wave may be generated by modulating f such that:

$$f = K/E_o {}^* i_{out} / v_{out} \quad (21)$$

Function generator 12 has an output $f_1 = K_1 \sin^2 \omega t$ which satisfies the requirements of equation 21 for generating a sine wave. A second output, $f_2$ simulates the average current flowing into the filter capacitor 72. The actual current is not used since it contains a large amount of high frequency components which will distort the output waveform.

$$f_2 = K_2 {}^* \omega {}^* \cos \omega t {}^* \text{sign}(\sin \omega t) \quad (22)$$

$$\text{where sign}(\sin \omega t) = \begin{cases} 1 \text{ for } \sin \omega t \geq 0 \\ -1 \text{ for } \sin \omega t < 0 \end{cases}$$

Outputs $f_1$ and $f_2$ are inputted to computing circuit 16 at inputs D and B respectively. According to equation 21 besides K which is available at input D, and $E_o$ which is available at input B, in order to generate frequency $f_1$, the output voltage $v_{out}$ and the output current, $i_{out}$ must be sampled. Output voltage is sampled by output voltage sensing circuit 18 and fed to input C of computing circuit 16. Likewise, output current is sampled by output sensing circuit 20 and fed to input A of computing circuit 16. Computing circuit 16 has an output voltage at output E which is proportional to the frequency, f, desired. This is accomplished in the computing circuit 16 by using the algorithm:

$$E = (A+B)/C {}^* D \quad (23)$$

where A, B, C, D and E are the inputs and outputs already described. Also, since the value of 0/0 is mathematically undefined, the circuit is preprogrammed to assign 0/0 the value of unity.

Since the output E, which is proportional to the frequency may be either positive or negative depending upon whether the converter is supplying energy or sinking energy and since voltage-to-frequency converter 22 only responds to positive voltage an absolute value circuit is used to determine the absolute value of output E as an input for voltage-to-frequency converter 22.

Since a bi-directional converter requires operation of two separate switches under conditions of power supply and power sink, the output of voltage-to-frequency converter 22, which is a string of pulses of frequency proportional to E, must be directed by single pole, double throw switch 26 to the appropriate switch drivers. A polarity detector 28 determines the polarity of output E and directs output pulse from the voltage-to-frequency converter 22, via switch 26 to either pulse distributor 30 or pulse distributor 32. When the inverter is supplying energy, pulse distributor 32 is activated.

For increased output power, a number of converters may be paralleled, therefore the positive pulse distribution circuit 32 has $n_1 + n_2$ outputs, each one activating n positive drive circuits of $n_1 + n_2$ converters. The negative pulse distribution circuit 30 has $n_1$ outputs, each one activating $n_1$ negative drive circuits of $n_1$ converters. From the above it follows that only a fraction of the paralleled converters are bi-directional, since the maximum amount of average negative power that has to be handled by an inverter is only 31.8% of the rated output power; the maximum amount occurs at zero power factor, requiring that only one third or less of the converters have to be bi-directional and $0 < n_2 \leq 1/3 \, n_1$.

Pulse Width Modulation

Equation (17) requires the energy delivered by each pulse, $E_o$, to be constant. This is accomplished by modulating the "on" time of the input pulses. The pulse width of pulses from pulse distributor 30 are modulated in width by negative converter drive circuit 34. Similarly, the pulse width of pulses from pulse distributor 32 are modulated in width by positive drive converter circuit 36. Output voltage is sensed by voltage output sensing circuit 18 and compared to a predetermined reference voltage 38 at the input of error amplifier circuit 40.

The output of error amplifier 40 is sent to the B input of both negative driver circuit 34 and positive driver circuit 36. Both of these drive circuits will initiate switch conduction at the arrival of a pulse from the respective pulse distributor 32 or 36 and terminate conduction when current in the switch (converted to a voltage) reaches a value equal to the output voltage of the error amplifier 40.

A deviation of the output voltage from the desired value due to slow drift of any of the system's constants will cause a change in output voltage of amplifier (40), which in turn will affect the value of Ipk, resulting in the corrective action described previously.

Unless disabled by magnetization sensing circuit 42, which senses demagnetization under conditions of overload, Gate 1, numeral 50, will pass switch operating pulses to switch 1, numeral 44; and, likewise, Gate 2, numeral 50, will pass switch operating pulses to switch 2, numeral 46. The function of the demagnetization sensing circuits is to protect the converters in case of a shorted output, by forcing the converters to operate in the discontinuous mode under any load condition.

As the familiar with the art will recognize, bi-directional flyback converter 52 includes an energy storage inductor having a primary winding 56, a secondary winding 54, primary switch 44, secondary switch 46, diodes 66 and 64, and filter capacitor 72. The converter delivers energy from the input source (battery 62) to the load connected across capacitor 72 as switch 46 is cycled, "on" and "off". During the "on" time, a current builds in winding 56. When switch 56 turns off, the current in winding 56, is interrupted. As the field in core 60 collapses a current appears in winding 54 and flows through diodes 66 to the load and capacitor 72. Diode 66 blocks the flow of current in winding 54 during the "on" time of switch 46. Diode 64 "is permanently off."

The transfer of energy from the load side to the battery 62 is done similarly, with functions of windings 54, 56 switches 44 and 46 and diodes 66 and 64 reversed.

Undirectional converters will lack diode 64, switch 46, and the associated drive circuitry.

As already discussed, the output of the converters is a full wave rectified sine wave. In order to generate the desired alternating sinusoidal output, a switching bridge is employed consisting of four single pole single throw switches in a bridge configuration. By alternately opening and closing switches located on opposing bridge legs, inversion may be accomplished. This switching is accomplished by a bridge drive circuit 70, driven by the output $f_3$ of function generator 12. Since this output is of the form:

$$f_3 = \text{sign}(\sin\omega t) \tag{24}$$

the bridge switches in bridge 68 will flip-flop in synchronism with the desired sine wave.

Prior to inversion, most high frequency ripple is removed by the filter capacitor 72. The output from bridge 68 is further filtered by low pass filter 74 and the sine wave output of the inverter is at 76.

Figure 2:
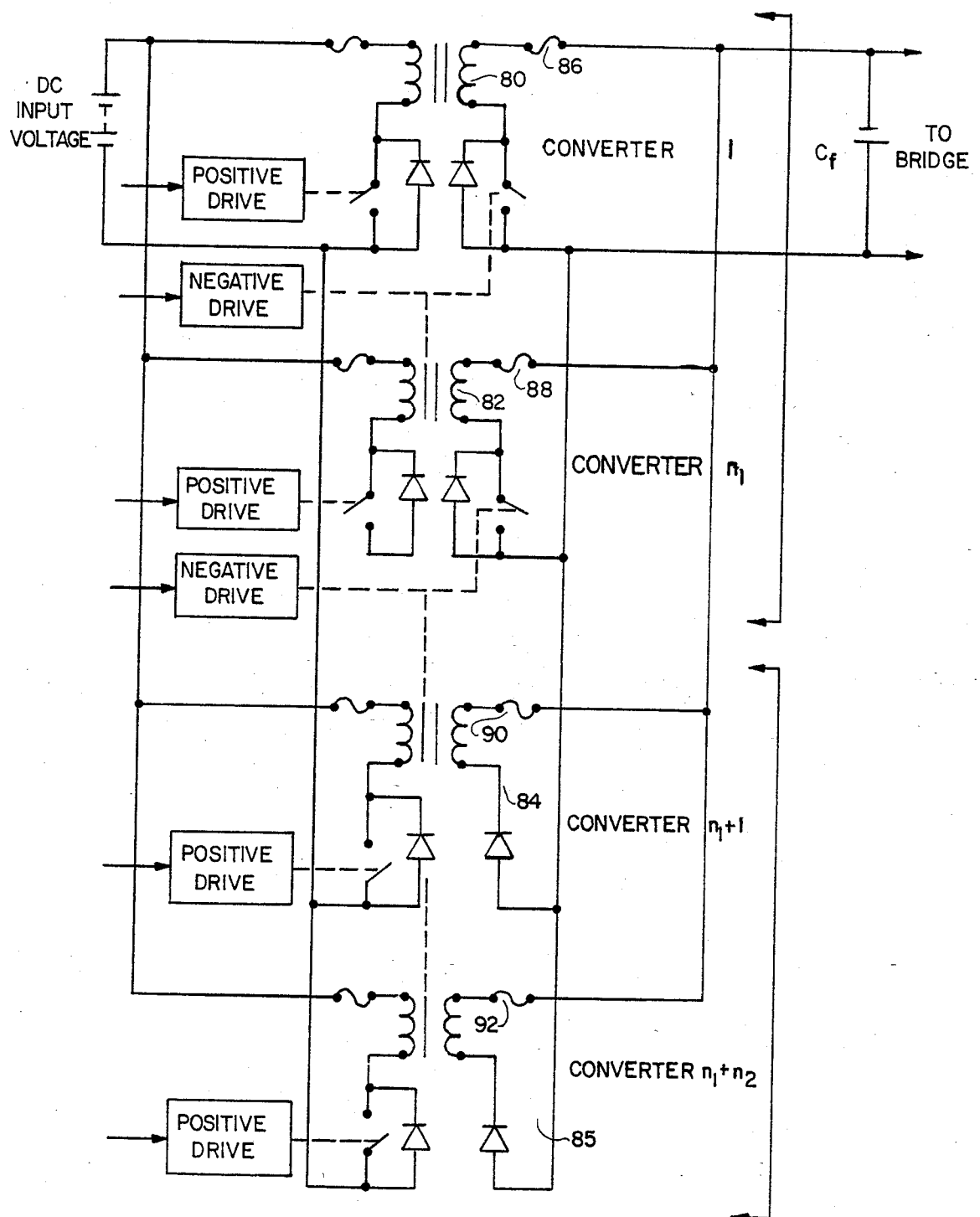
FIG. 2 is a partial electronic block diagram showing the connections of an arbitrary number of converters.
Figure 3:
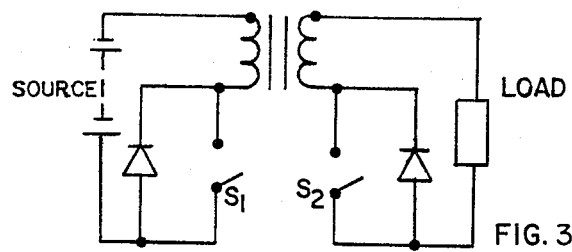
FIG. 3 is an electronic schematic diagram of a bi-directional converter.
Figure 4:
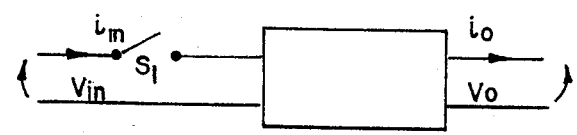
FIG. 4 is an electronic block diagram of a power converter.

In FIG. 2, it may be seen how a large number of converters $n_1 + n_2$ may be paralleled for increased output power and reduced ripple. The outputs of converter 1, numeral 80, through converter $n_1 + n_2$, numeral 85 are paralleled. The number of converters is unlimited. Each of the converters are fused as indicated by fuses 86, 88, 90 and 92. In a system where n is a large number, the failure of any one or several converters will have little impact on the output power or waveform. The pulse distribution circuit sends the pulses from the voltage-to-frequency converter sequentially to each converter in order to guarantee a high ripple frequency with its consequent reduction in size and weight of filter components. Converters 80 and 82 are part of a group of bi-directional converters which total $n_1$ units. Converters 84 and 85 are part of a group of uni-directional converters which total $n_2$ units.

The operation of the described circuit may be represented mathematically as follows:

$$P_{out} = f^* E_o \tag{25}$$

where $E_o$ is the energy transferred to the output or from the output by one pulse of the bi-directional flyback converter.

If $I_{pk}$ has a constant value, then the value of $E_o$ will also be constant.

Assuming for clarity that the conversion factor of the voltage to frequency converter equals unity, the frequency f will be according to algorithm (23):

$$f = ((i_{out} + f_2)/v_{out})^* f_1 \tag{26}$$

Where $i_{out}$ is the current delivered to the load and $f_2$ represents the current $i_{cf}$ flowing in the filter capacitor 72.

$$f_2 = i_{cf} \tag{27}$$

Substituting (26) into (25) yields:

$$P_{out} = E_o^*((i_{out} + f_2)/V_{out})^* f_1 \tag{28}$$

The converters' output power is also equal to the sum of the powers delivered to the filter capacitor and the load:

$$P_{out} = P_{cf} + P_{load} = V_{out}^*(i_{out} + i_{cf}) = V_{out}^*(i_{out} + f_2) \tag{29}$$

Equating (28) and (29) yields:

$$V_{out}^*(i_{out} + f_2) = E_o^*((i_{out} + f_2)/V_{out})^* f_1 \tag{30}$$

Solving for $V_{out}$ yields:

$$V_{out} = (E_o f_1)^{\frac{1}{2}} = (E_o K_1)^{\frac{1}{2}} * |\sin\omega t| \tag{31}$$

$$\frac{\sqrt{2}}{2} *(K_1 L_m)^{\frac{1}{2}} *|\sin\omega t|$$

which is a full wave rectified sine wave, whose amplitude is independent of the input source voltage or the load current, an important object of the invention.

It is apparent from the above that any output waveform can be generated by making $f_1$ equal to the square of a replica of the wanted output voltage and $f_2$ equal to the current forced into the filter capacitor by the wanted output voltage.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention. It is also understood that a person skilled in the art can devise a computing circuit capable of forcing condition (1) on a converter having a topology other than flyback, in order to obtain the same operational characteristics.

What is claimed is:

1. A two quadrant power modulator comprising in combination:
    a. at least one bi-directional flyback converter capable of transferring energy from a source in its primary side to a load in its secondary side and vice versa;
    b. a positive drive circuit, which when activated by a pulse applied to its input, will turn on the primary side switching element of said bi-directional flyback converter and will then turn primary side switching element off when the current in primary side switching element reaches a predetermined value, thereby causing the transfer of a fixed amount of energy, $E_o$, per conduction period to be transferred from the said source to said load;
    c. a negative drive circuit, which when activated by a pulse applied to its input, will turn on the secondary side switching element of said bi-directional flyback converter and will then turn said secondary side switching element off, when the current in said secondary side switching element reaches a predetermined value, thereby causing the transfer of a fixed amount of energy, $E_o$, per conduction period to be transferred from the said load to said source;

d. a voltage to frequency converter that generates a train of pulses whose frequency is proportional to the voltage applied to the input of the said voltage to frequency converter;

e. a single pole double throw switch, activated by a polarity detector that directs the pulses generated by said voltage to frequency converter to the input of the said positive drive circuit when the input voltage to said polarity detector is positive and to the input of the said negative drive circuit when the input voltage to said polarity detector is negative;

f. an absolute value circuit whose output voltage equals the absolute value of its input voltage and whose output constitutes the input to the said voltage to frequency converter; and g. a computing circuit, characterized by four inputs A, B, C, D, and one output E, programmed to perform the operation:

$$E = ((A+B)/C)*D$$

and whose output E constitutes the inputs to the said polarity detector and the said absolute value circuit.

2. A two quadrant power modulator, as recited in claim 1 further comprising four inputs to said computing circuit being defined as:

$D = K$, where K is a constant;

$B = E_o$ and $E_o$ is the fixed amount of energy per conduction period transferred by the said flyback converter;

$A = i_o$, the current delivered to said load by said bi-directional flyback converter; and $C = v_o$, the voltage delivered to said load by said bi-directional flyback converter.

3. A two quadrant power modulator, as recited in claim 2 that will deliver an output voltage $V_o = \sqrt{K_1 E_o^*} |\sin\omega t|$, the said output voltage being essentially independent of changes in the value of voltage of said source in the primary side of said bi-directional flyback converter or by the changes in load current of said bi-directional flyback converter.

4. A two quadrant power modulator, as recited in claim 1 using at least 2 flyback converters operating in opposite directions, instead of said bi-directional flyback converter.

* * * * *